United States Patent
Torcomian

Patent Number: 6,116,667
Date of Patent: *Sep. 12, 2000

[54] TRAILER UNDERRIDE CRASH GUARD

[76] Inventor: Albert Torcomian, 1709 Josie La., Havertown, Pa. 19083

[*] Notice: This patent issued on a continued prosecution application filed under 37 CFR 1.53(d), and is subject to the twenty year patent term provisions of 35 U.S.C. 154(a)(2).

[21] Appl. No.: 09/227,703

[22] Filed: Jan. 8, 1999

Related U.S. Application Data

[60] Provisional application No. 60/070,859, Jan. 9, 1998.

[51] Int. Cl.[7] .................................................. B60R 19/36
[52] U.S. Cl. .......................................... 293/132; 293/132
[58] Field of Search ................................ 293/118, 132, 293/135, 133, 155, 131

[56] References Cited

U.S. PATENT DOCUMENTS

| | | | |
|---|---|---|---|
| 3,871,695 | 3/1975 | Koenig | 293/73 |
| 4,410,207 | 10/1983 | Scharf | 293/118 |
| 4,514,002 | 4/1985 | McIntosh | 293/118 |
| 4,541,661 | 9/1985 | Hawk | 293/117 |
| 4,641,871 | 2/1987 | Vaughn | 293/118 |
| 4,979,770 | 12/1990 | Shal-Bar | 293/131 |
| 5,520,428 | 5/1996 | Bell | 293/118 |
| 5,624,143 | 4/1997 | Waldschmitt | 293/118 |

*Primary Examiner*—D. Glenn Dayoan
*Assistant Examiner*—Paul Chenevert
*Attorney, Agent, or Firm*—Robert B. Famiglio, Esq.; Famiglio & Associates

[57] ABSTRACT

A vehicle bumper and underride crash guard protection device to prevent other vehicles underriding the protected vehicle. The bumper or guard system uses pre-tensioned brake plates which absorb energy by moving at a predetermined force. The bumper structure has a pivoting arrangement such that upon contact of the main bumper guard by a vehicle, the pivoting member transmits the horizontal force of the moving vehicle to the pre-tensioned energy absorption devices usually located under the vehicle. The bumper system allows large, load-carrying vehicles to comply with certain vehicle regulatory requirements for a crash guard bumper with the capability of deforming, moving or absorbing crash forces at predetermined impact points in a predetermined and regulated fashion.

2 Claims, 20 Drawing Sheets

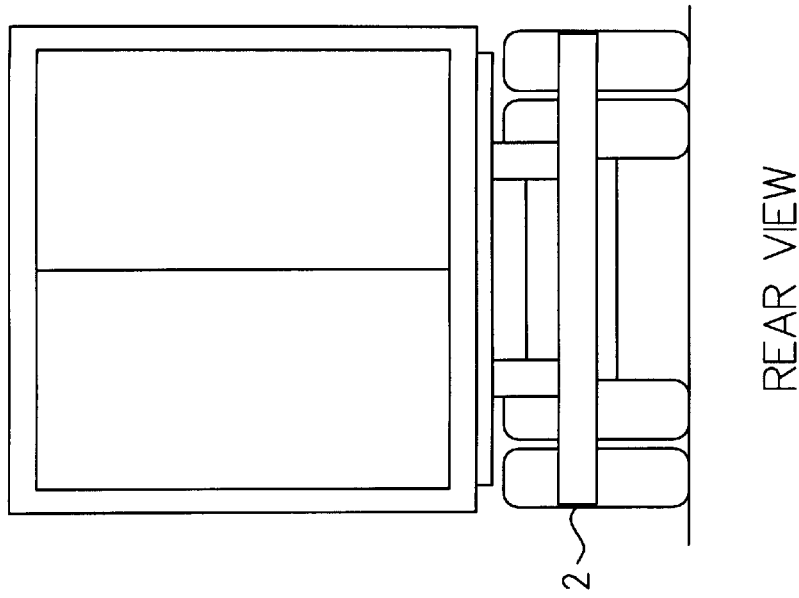
REAR VIEW
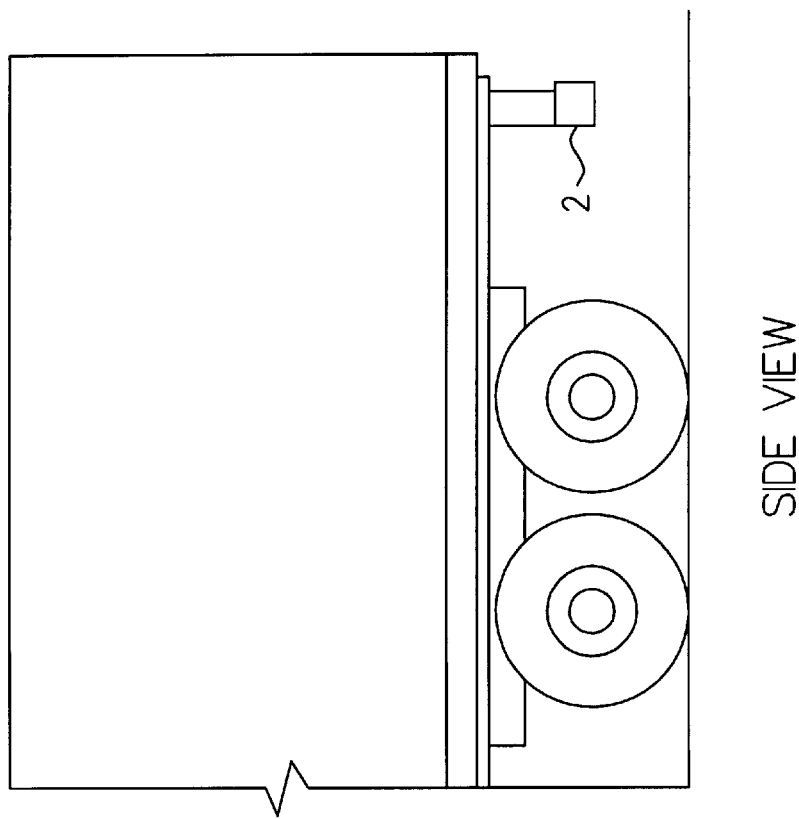
SIDE VIEW
Fig-5

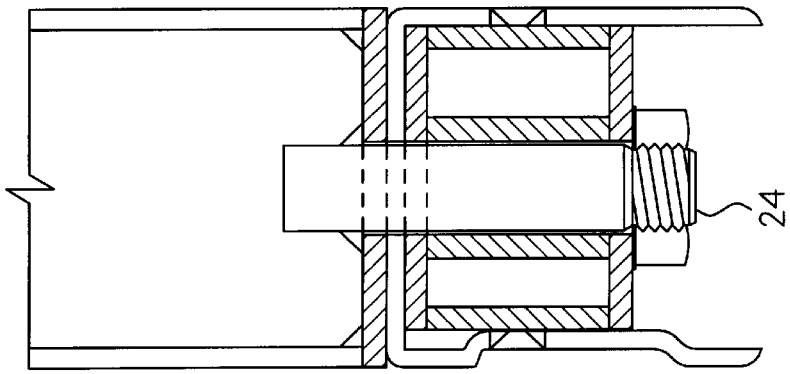
SECTIONAL VIEW
BINKLEY TUBE ASSEMBLY
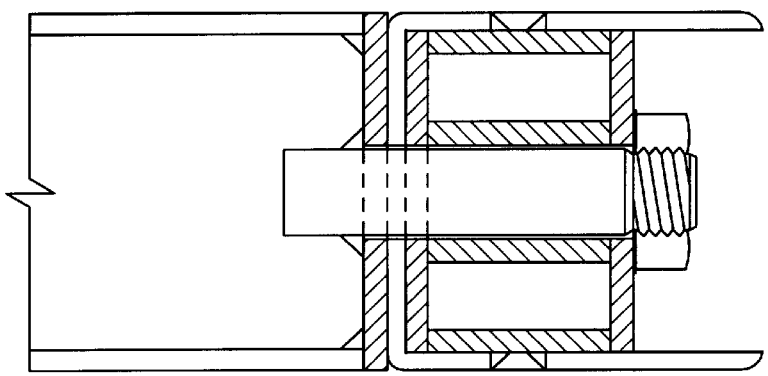
SECTIONAL VIEW
4" x 4" x 3/16" TUBE ASSEMBLY
Fig-6

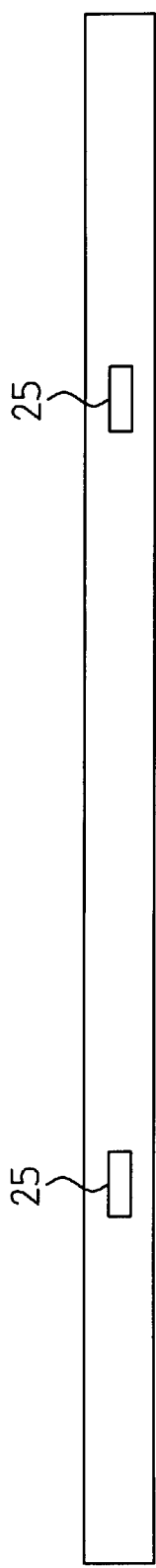
TOP VIEW
BOTTOM VIEW
SIDE VIEW
Fig-7

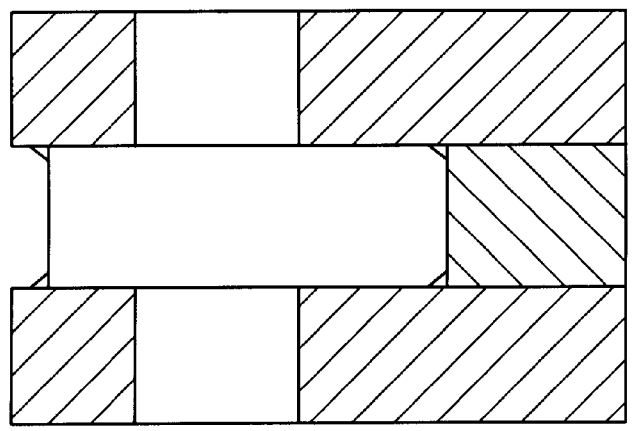
SECTION A—A
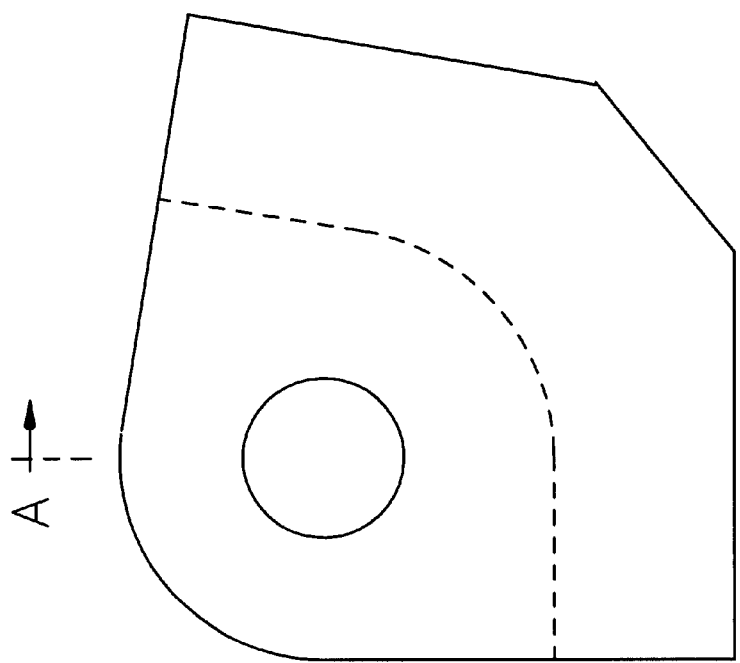
SIDE VIEW
Fig-8

VIEW A—A

SIDE VIEW

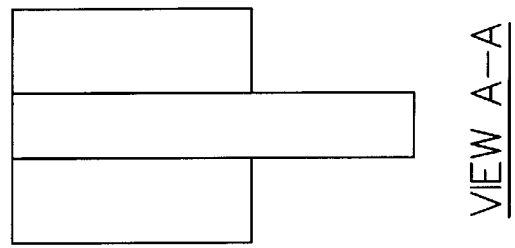
VIEW A-A
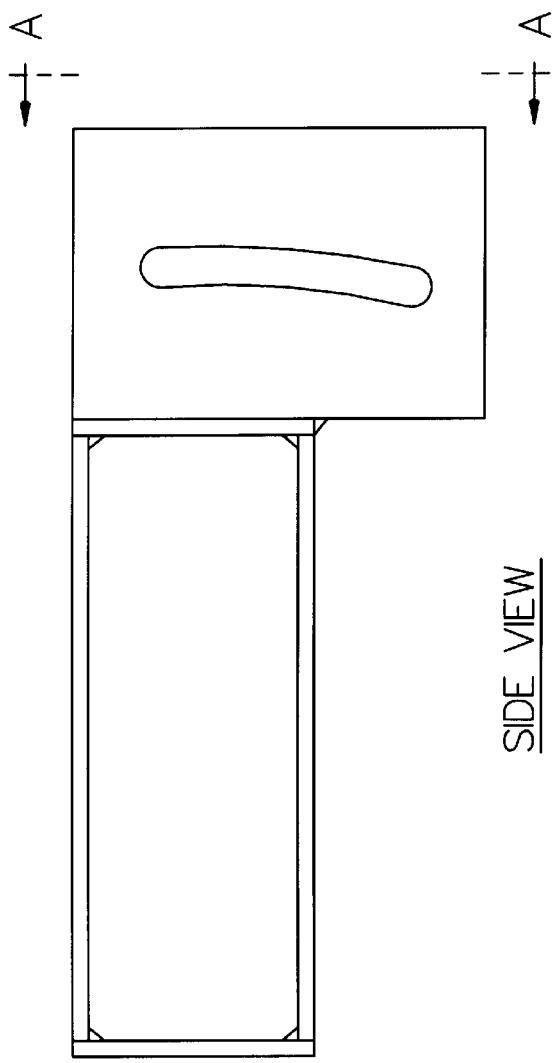
SIDE VIEW
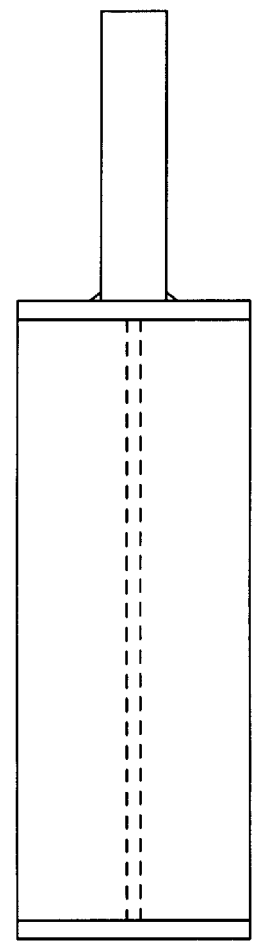
TOP VIEW
Fig-10

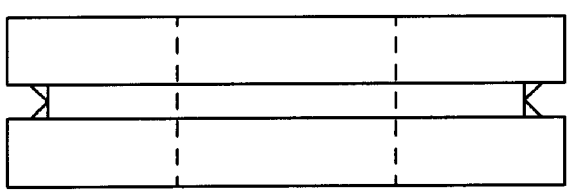
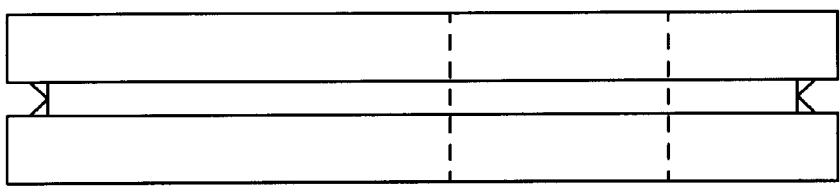
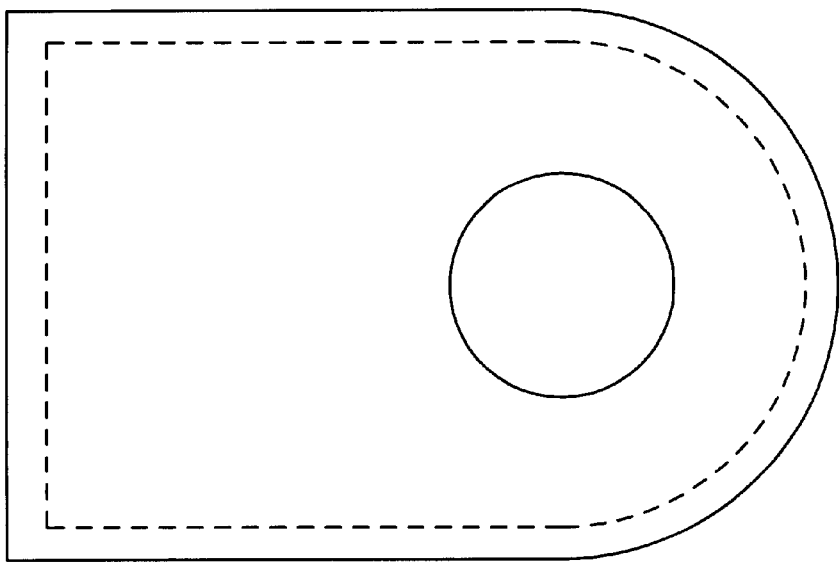
Fig-11

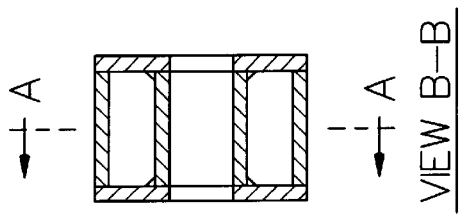
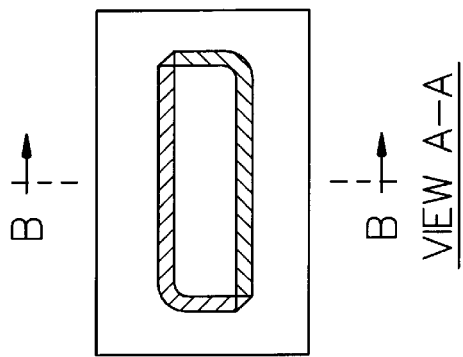
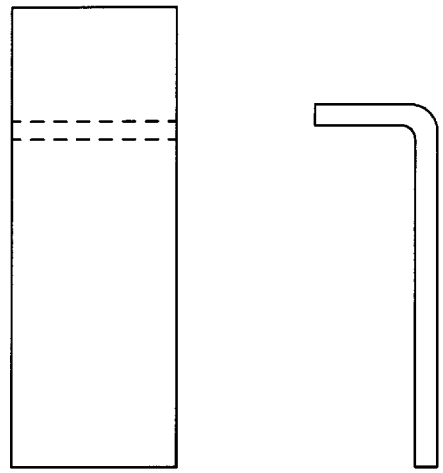
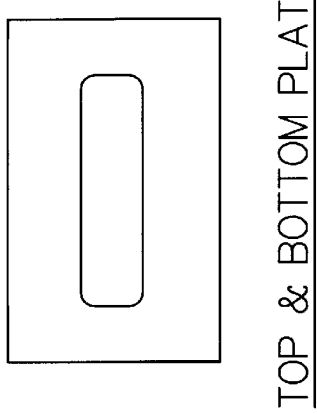
Fig-13

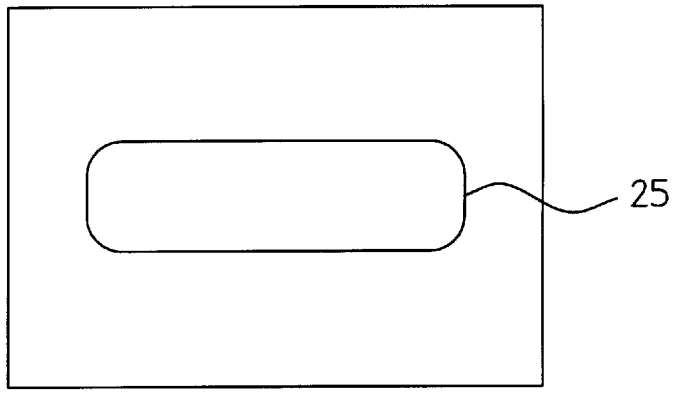
TOP VIEW
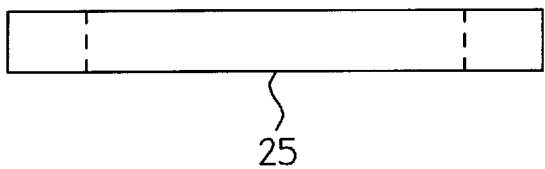
SIDE VIEW
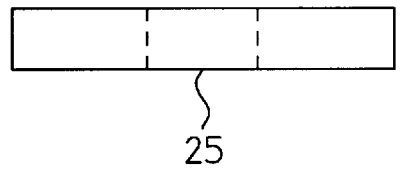
END VIEW
Fig_18

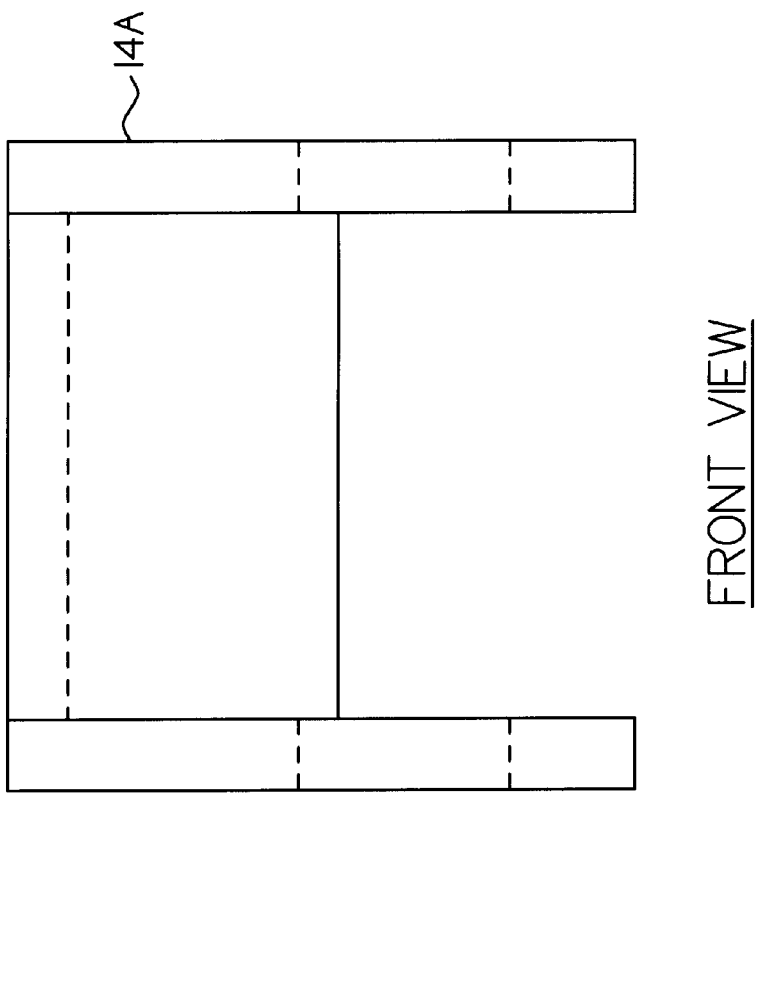
FRONT VIEW
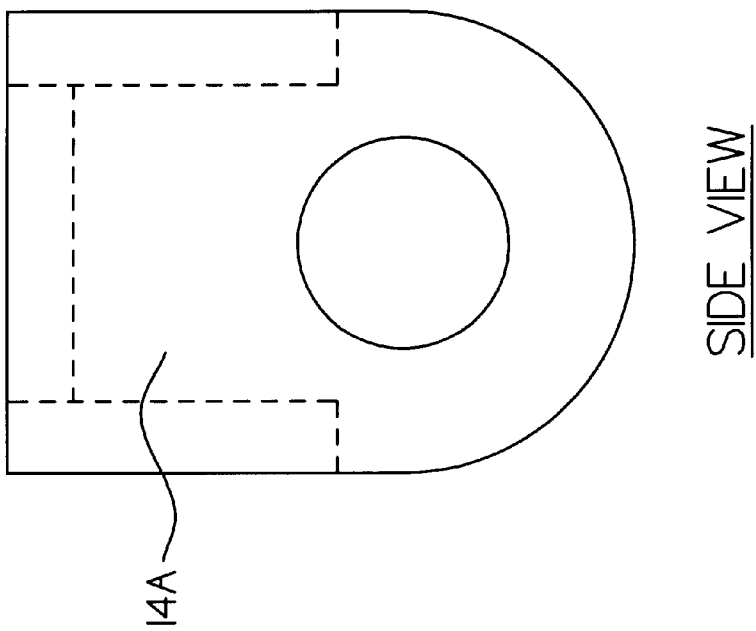
SIDE VIEW
Fig-19

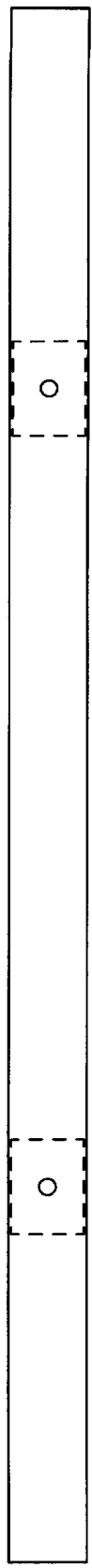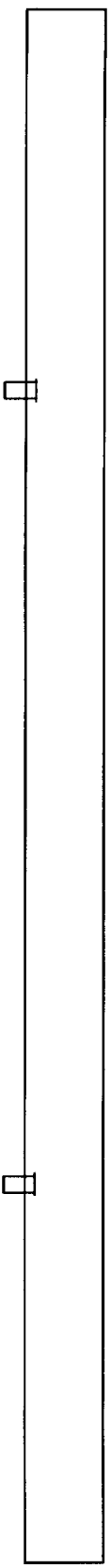
TOP VIEW
SIDE VIEW
Fig-20

TRAILER UNDERRIDE CRASH GUARD

CROSS REFERENCES TO RELATED APPLICATIONS

This application claims the benefit of the filing date for the applicant's provisional application, serial number 60/070,859 which was filed Jan. 9, 1998.

BACKGROUND OF THE INVENTION

The disclosed invention addresses the need for an underride guard design for trailers, trucks and other transportation vehicles as mandated by certain newly promulgated regulations for federal motor vehicles safety standards involving rear impact guards and rear impact protection. Rear impact guards and similar impact protection devices may sometimes be referred to as bumpers in a more conventional sense, comparing such members to the equivalent crash protection device found on conventional automobiles and similar vehicles. The National Highway Traffic Safety Administration now requires all new transportation vehicles falling under the defined categories to install underride guards meeting the standards issued. Standard FMVSS223 is an equipment standard that specifies requirements that underride guards must meet before being installed. Standard FMVSS224 is a new vehicle regulation mandating the installation of underride guards on most new trailers and semi-trailers with a GVW rating of 4,536 kilograms (10,000 pounds) or more. Standard FMVSS224 also specifies the location of the guard on the vehicle or trailer.

In the past, trailers frequently employed a simple rear impact guard comprised of a horizontal member which acts as a rudimentary bumper. Such horizontal member did not comply with any energy absorption standard and was not designed for the purpose of controlling energy absorption which might be experienced by the member in an automobile collision or other similar situation where a moving vehicle or other mass was striking the member.

The federal regulations which the present invention addresses specifies that the underride guard must have a horizontal member with a cross-sectional height of at least four inches throughout its length. The beam must be able to withstand two levels of force depending on where the force is applied along the horizontal member of the guard.

The specifications referenced indicate that the horizontal member must not deflect more than 125 mm (5 inches), when subjected to a force of 50 newton (11,240 pounds) applied at either end of the horizontal member. The same deflection tolerance applies when a 100 newton force (22,480 pounds) is delivered at a point where the horizontal and vertical members intersect. A 50 newton force should cause no more than 125 mm deflection when applied to the beam at a point midway between the two vertical members. There are additional requirements that the guard must demonstrate the ability to absorb energy. The specification requires that unless the underride guard uses a form of hydraulic cylinders to absorb impact, it must absorb by plastic deformation at least 5,650 J (4,167 ft. lbs.) of energy within the first 125 mm (5 inches) of deflection. The present invention is one simple, straightforward solution which is designed to meet the requirements of the above specified regulations.

It is therefore the object of the present invention to provide a trailer underride guard which is simple to install, requires no hydraulic operating members or other such devices.

It is also the object of the present invention to provide a underride guard bumper for trailers which complies with the requirements of the National Transportation Safety Administration specifications.

It is yet a further object of the present invention to provide a trailer underride guard protection bumper which may be easily retrofitted to existing transportation vehicles or used in other scenarios where a crash guard protection bumper is required to absorb energy from a striking object or vehicle.

It is another object of the present invention to provide a vehicle underride guard protection bumper which provides a mechanism to adjust the operating force required to move the bumper by simple adjustment of torqing various fastening bolts or similar connecting means to apply pressure or friction across an integral braking mechanism within said bumper structure by adjustment of the torq applied to such connection or fastening means.

It is another object of the present invention to provide an underride guard bumper for vehicles which are reusable or resettable without replacement of structural members of the bumper after being involved in a vehicle strike.

SUMMARY OF THE INVENTION

The present invention is an improved underride guard system for trailers and other transportation vehicles. The present invention may also be used as an energy absorption device for fixed barriers or other structures where controlled energy absorption from a collision or other undesired movement may be controlled. In the preferred embodiment, a rear truck trailer bumper is provided comprising a horizontal member which is attached to at least one vertical member of a bell crank structure which transmits horizontally applied force through a fixed knee joint to provide for motion by a brake plate compressed by an attaching bolt in a fashion that allows absorption of the energy so transmitted through the bell crank in a manner determined by both the size of the brake plate and the compression specifications of the attaching brake plate bolt. As will be described in the specification below, a single member attached to a bell crank structure in some applications will be sufficient to provide the protection desired and to function with all the advantages of the present invention. By using a single bolt to connect the horizontal member to the one vertical member, rotation of the horizontal member is provided around the axis defined by the single bolt used as connection means between the horizontal member and the vertical structure supporting the horizontal member.

The preferred embodiment provides for two bell crank structures wherein each of their vertical members attaching to the horizontal bumper plate are affixed by using a singular compression bolt which allows for movement of the horizontal member about the axis of such attachment bolt. This allows for absorption of energy from a vehicle striking the horizontal member in an off centered position wherein the movement of the horizontal member is permitted such that the horizontal member moves in a non-parallel fashion to its starting position. By allowing the rotational movement between the vertical member of the bell housing and the horizontal bumper, the energy of certain collisions can be absorbed without deforming the horizontal member or causing other damage to the underride guard which would require replacement of the constitute components. The present invention provides a simple means of complying with underride guard bumper requirements for trailers or other vehicles without the use of hydraulic systems for absorption or damping of the energy resulting from a striking vehicle.

An alternative embodiment provides for a brake plate device to absorb the energy being conveyed by the movement of the horizontal bumper in an increasing fashion depending on the horizontal displacement of the member. Disclosed is a wedge design for the brake plate system which allows a means to provide a controlled increase in braking force of the system disclosed which is entirely dependent on the amount of displacement of the horizontal member.

BRIEF DESCRIPTION OF THE DRAWINGS

FIG. 5 is an illustration showing the federal regulation requirements for the location of the horizontal member and the specifications provided for the position and the dimensions of the horizontal member specified in the regulations.

FIG. 6 is a detailed view of the fabricated fitting assembly for interface between the horizontal bumper member and the vertical member of the bell crank assembly illustrating further the detail of the fitting of the horizontal member to said vertical bell crank member.

FIG. 7 is a detailed view of the impact guard horizontal member.

FIG. 8 is a detailed view of the fabricated bell crank trunnion comprising what is referred to as the knee joint in the present invention.

FIG. 10 is a detailed drawing of the bell crank assembly horizontal member of the present invention.

FIG. 11 is a detailed drawing of the fabricated rear sill trunnion which is used as a brake plate housing in the present invention.

FIG. 13 is a detailed view of the fabricated fitting for the horizontal member illustrated in the present invention.

FIG. 18 is a combination top side and end view of the slotted fitting used on the alternative embodiment of the invention to connect the horizontal member to the vertical member of the bell crank assembly.

FIG. 19 is a combination side and front view of the bell crank hanger bracket used for the bell crank member in the alternative embodiment.

FIG. 20 is a combined top and side view of the horizontal bumper member showing its dimensions in the alternative embodiment in its fabricated assembly presentation.

DETAILED DESCRIPTION OF THE INVENTION

A preferred embodiment of the invention will now be described in detail with reference to the various figures wherein like numbers generally represent like parts.

Turning to FIG. 5, the object of the present invention is illustrated showing a horizontal member protruding from the back of a typical truck trailer, thereby being placed in a position to intercept a colliding vehicle which may be accidentally intercepting the rear of the truck. Horizontal member 2 is designed to contact the intersecting vehicle as in a fixed bumper commonly used in the prior art. However, the present invention provides an improvement whereby a horizontal member 2, acting in conjunction with the other components, which will be described below, transmit the force applied by the intersecting vehicle in a fashion to allow deformation of the entire bumper structure so that the energy of the collision may be absorbed without damage or permanent deformation of the components used in the underride guard mechanism provided. FIG. 5 is an illustration which sets forth the regulatory standards required for new vehicle construction as described in the background of the invention.

Figure 1:
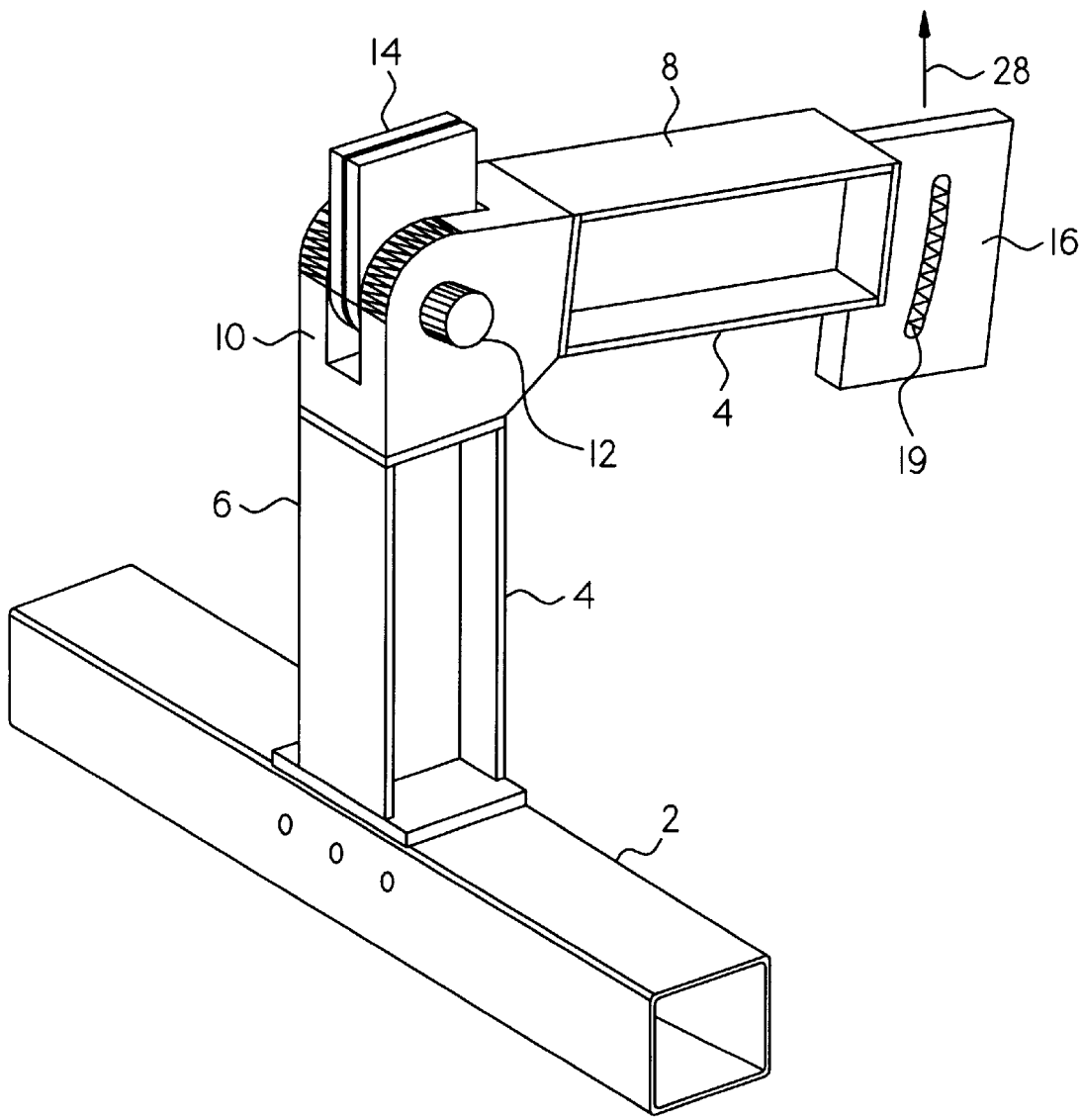
FIG. 1 is a three dimensional view of the bell crank member of the present invention showing its attachment to the horizontal bumper member and the brake plate.

Turning to FIG. 1, it can be appreciated that the disclosed invention is a bumper structure comprised of horizontal member 2 affixed to vertical member 6. Vertical member 6 is an integral part of the bell crank structure 4 which pivots about axial bolt 12 at fixed knee joint 10. Knee joint 10 is suspended through the knee joint axial bolt 12 through the bell crank hanger bracket 14. Hanger bracket 14 is permanently affixed to the understructure or frame of the vehicle being protected as is illustrated more clearly in FIG. 3.

The horizontal bell crank member 8 is permanently connected to brake plate 16 in a fashion to transmit any horizontal movement of horizontal member 2 into substantially vertical movement of brake plate 16 in direction 28. Thus, vehicle striking horizontal member 2 will displace member 2 thereby causing rotation of bell crank 4 about the axis of bolt 12 ultimately providing for movement of brake plate 16 in direction 28.

Figure 2:
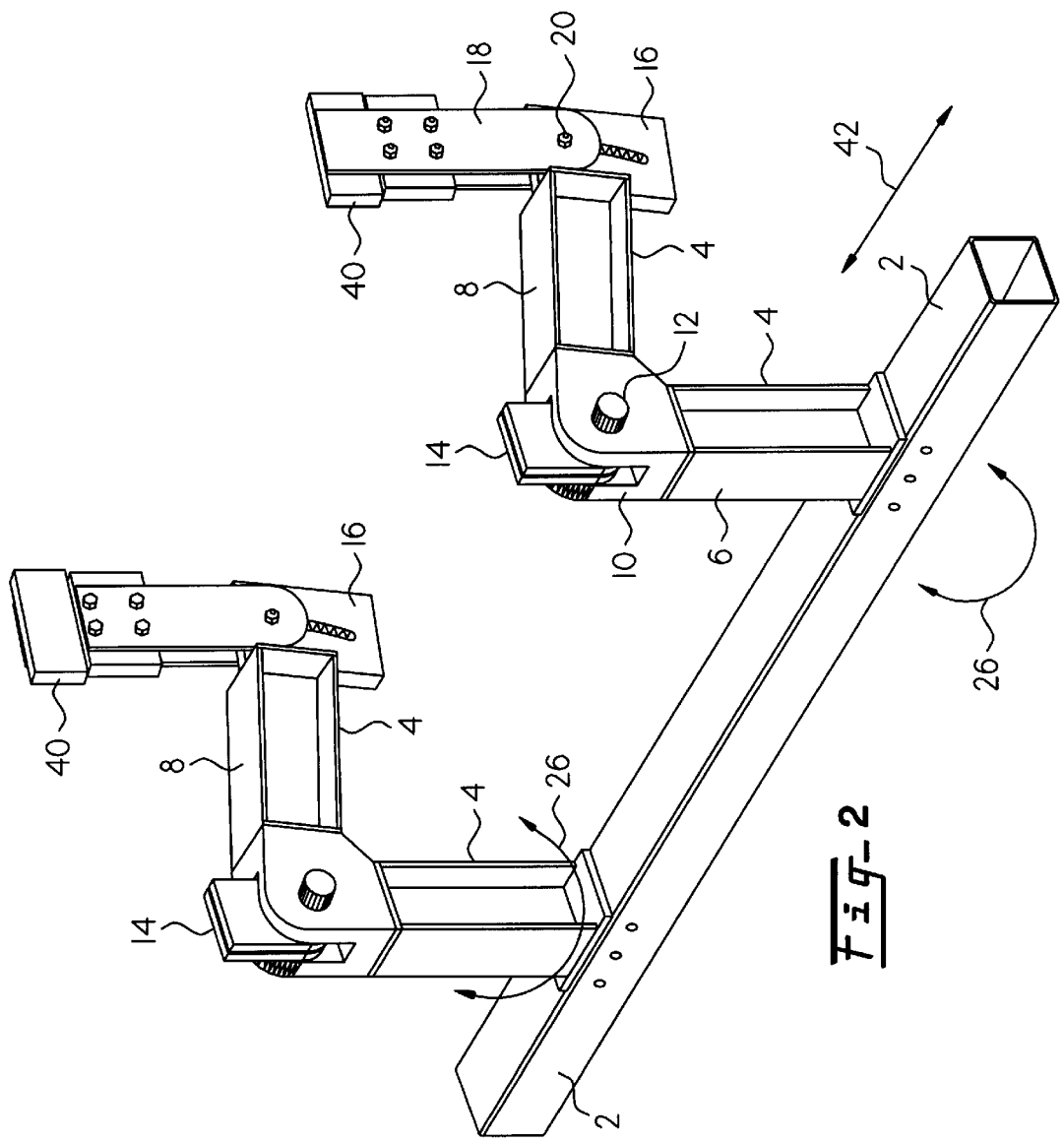
FIG. 2 is a three dimensional view of the bell crank assembly showing both assemblies used in a first embodiment as attached to the horizontal bumper member.

Turning to FIG. 2, the first embodiment is illustrated with a typical horizontal member 2 as being attached to two separate bell crank members 4.

Figure 3:
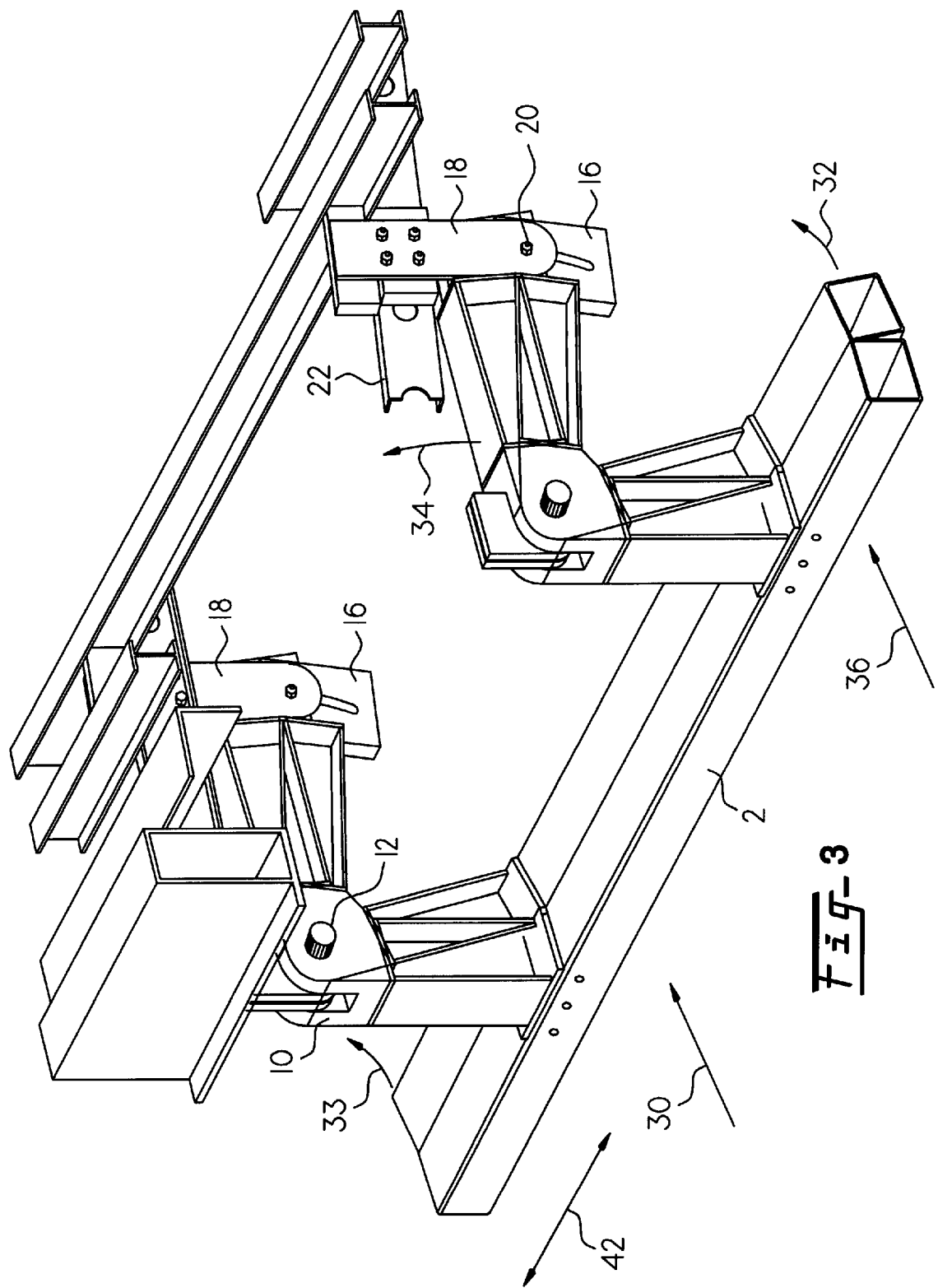
FIG. 3 is a three dimensional ghosted view of the first embodiment showing both bell crank assemblies and the horizontal member as they move during the application of a striking force.
Figure 4:
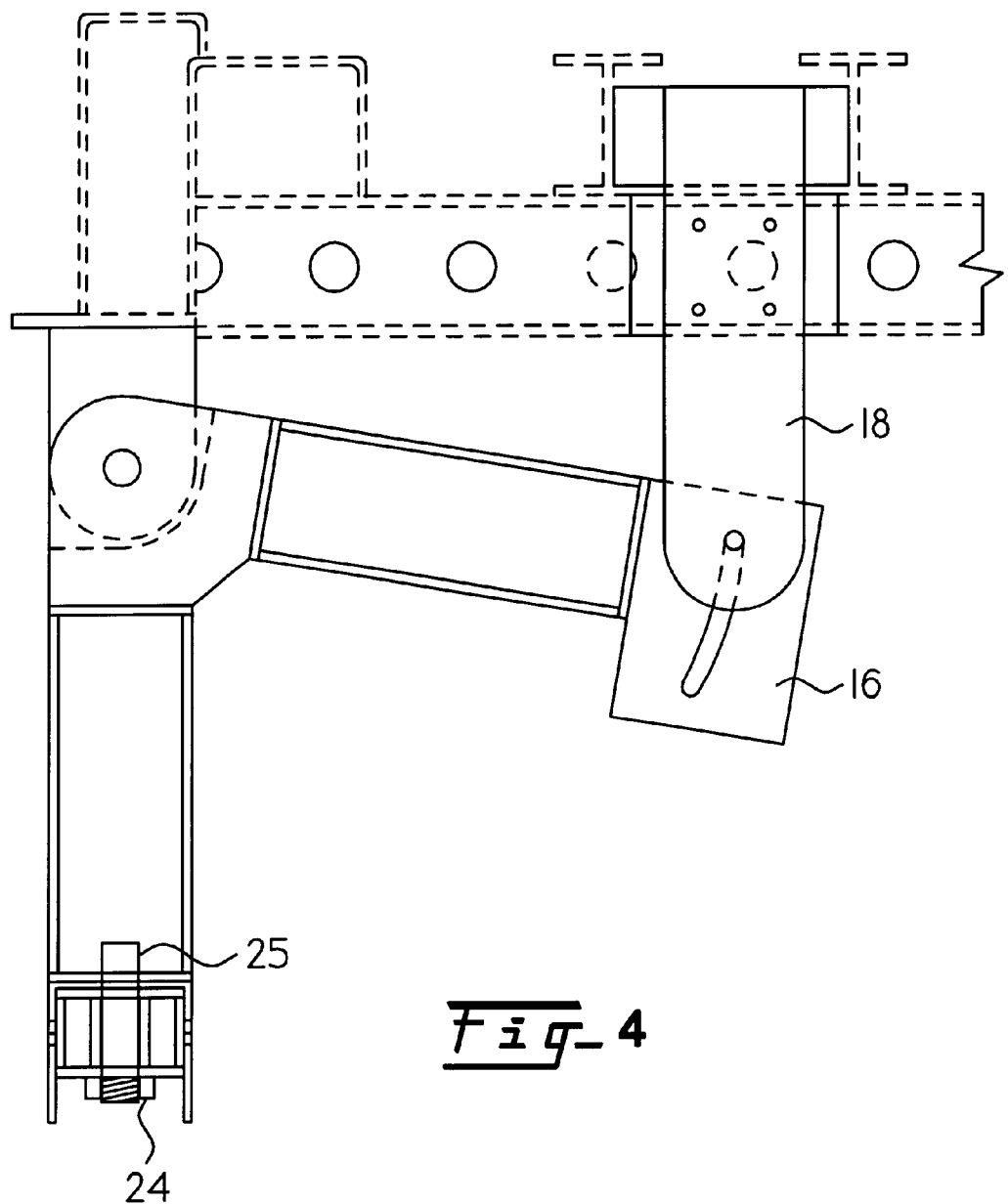
FIG. 4 is a detailed drawing showing details of one embodiment of the bell crank assembly.

In the first embodiment, horizontal member 2 is affixed to vertical member 6 of each bell crank 4 using single bolt 25 illustrated more particularly in FIG. 4. By affixing member 2 to member 6 using a single bolt, freedom of movement between vertical member 6 and horizontal member 2 is allowed in rotational direction 26 shown on FIG. 2. It will be appreciated that the application of force in an off center position on member 2, as illustrated in direction 36 in FIG. 3, will provide the deflection of member 2 which may be greater at the edge of member 2 closest to force 36 thereby causing movement 32 to be greater than movement 33 shown at the opposite end of member 2 in FIG. 3.

In the event the striking force is applied largely to the center of member 2 as illustrated in direction 30, movement of horizontal member 2 will be fairly uniform thereby displacing member 2 equally in direction 32 and 33 as shown in FIG. 3.

Considering FIG. 3 further, it would be appreciated that the transmission of the striking force on member 2, causing its displacement in direction 32 and 33, will equally cause displacement of the horizontal member 8 in direction 34 as illustrated. This provides for movement of the attached brake plate 16 which is the essence of the present invention. Brake plate 16 is compressed between brake plate housing 18 illustrated in detail in FIG. 12. Absorption of the energy caused by striking force 30 occurs largely because of the compression applied by the torquing of brake plate bolt 20. The compression which occurs provides a substantial, normally applied force, between brake plate housing 18 and brake plate 16 thereby absorbing the energy which is being transmitted through the bell housing 4 because of the displacement of member 2.

Figure 9:
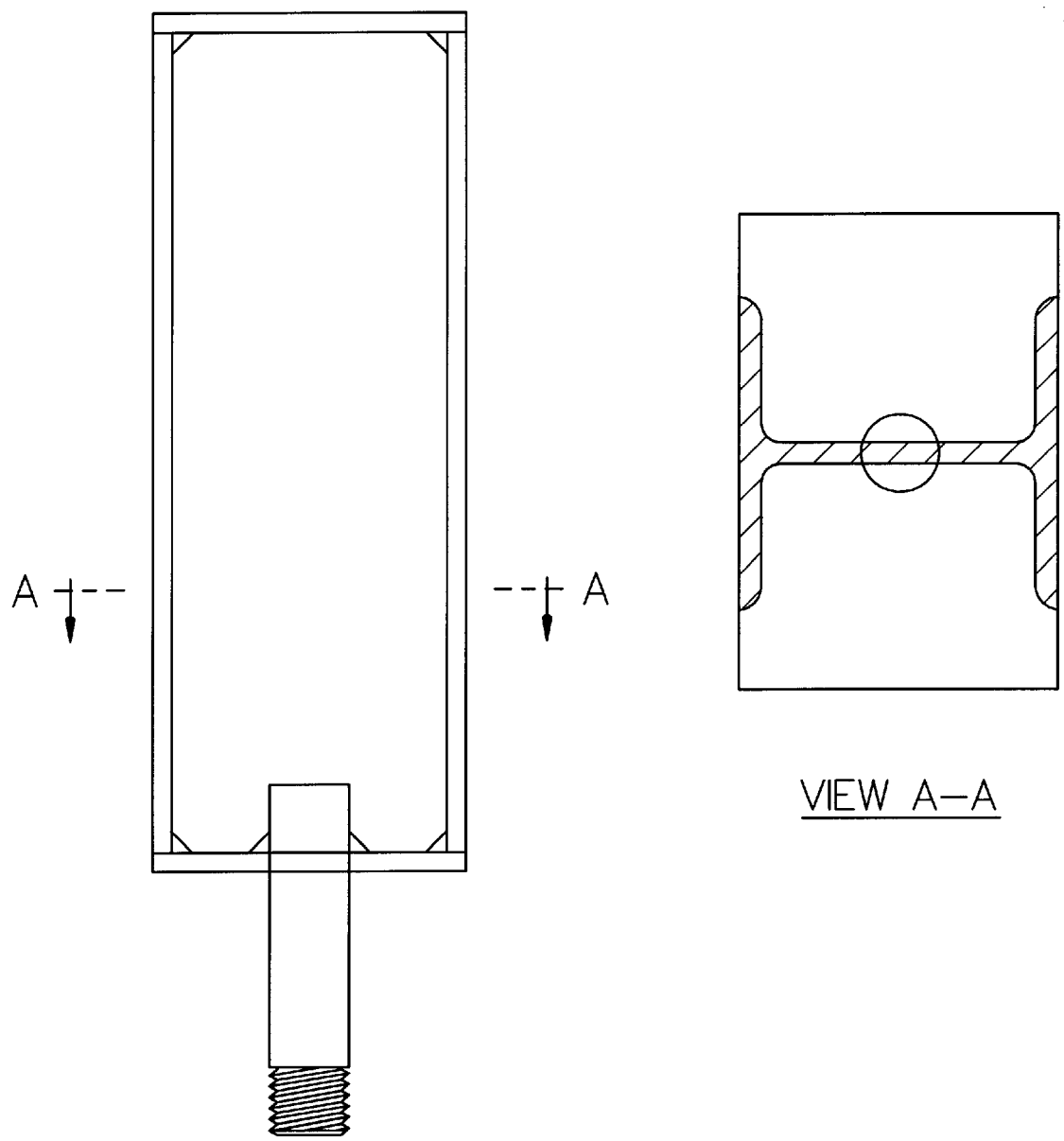
FIG. 9 is a detailed drawing of vertical member of the bell crank assembly detailing its construction.
Figure 12:
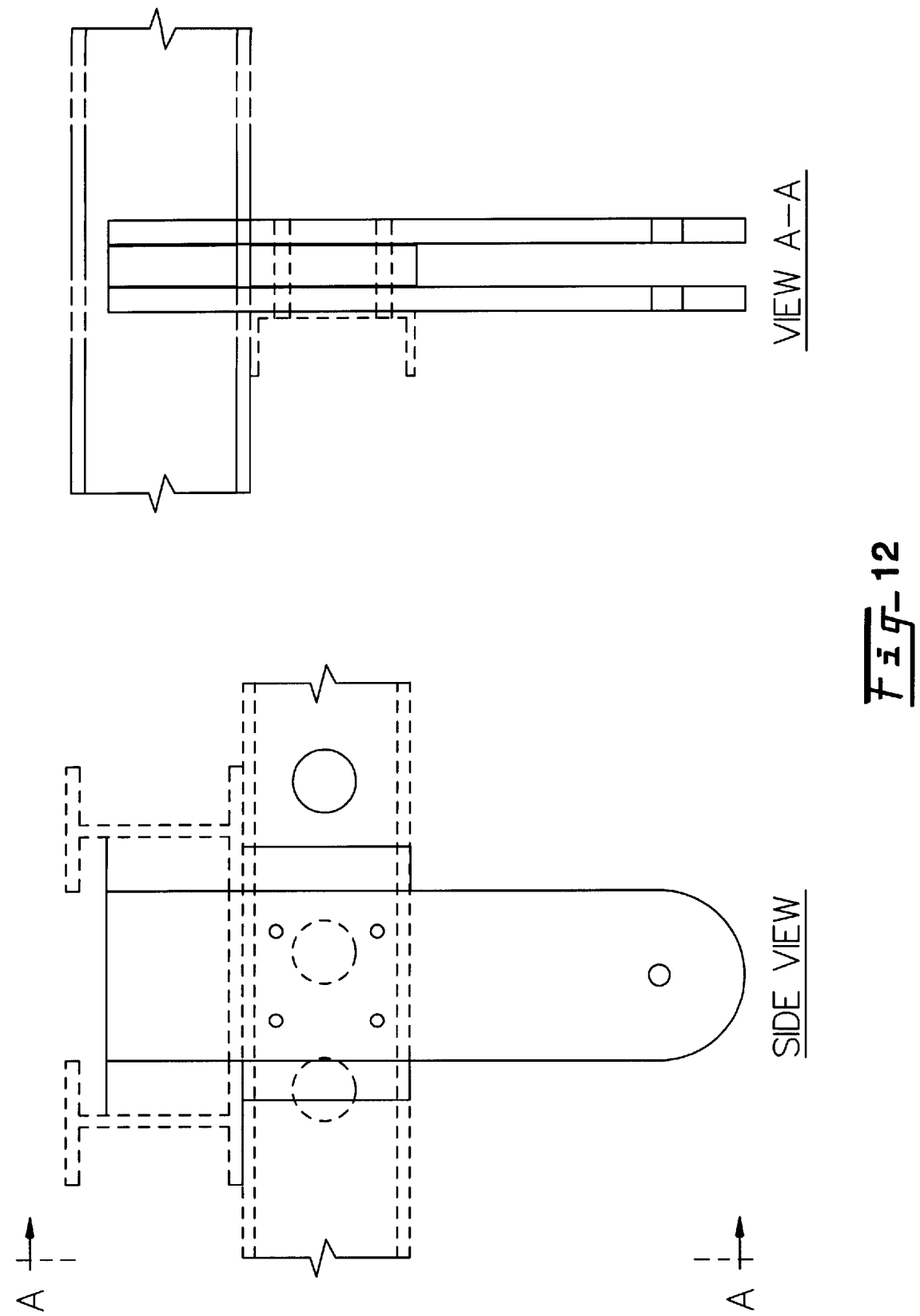
FIG. 12 is a detailed view of the fabricated break assembly of the present invention.

FIG. 4 shows a detail view of the construction in the first embodiment illustrating brake plate 16 and its relationship to brake plate housing 18. Details of the attachment point of member 2 to the bell crank 4 is shown in FIG. 6 wherein it will be appreciated that the jam nut 24 can apply compression such that the torque required to rotate member 2 about the axis defined by bolt 24 can be calculated and applied as part of the design criteria to provide for a symmetrical lateral movement of horizontal member 2. FIG. 7 shows additional details of the construction of the horizontal member 2. FIG. 8 describes in detail dimensions of the fabrication of the bell crank trunnion referred to as fixed knee joint 10 in the other figures. Vertical bell crank member 6 is detailed in FIG. 9. The horizontal bell crank member 8 is detailed in FIG. 10 illustrating the attachment of member 8 to the brake plate 16 shown therein. FIG. 11 is a detailed drawing of the fabrication of the rear sill trunnion described as brake plate housing 18 in the other drawings. FIG. 12 provides the details of the brake plate 18 and its attachment to housing hanger 40 which provides for attachment of the system described to the undercarriage and frame of the vehicle being protected. FIG. 13 provides the details of the fabrication of the horizontal member 2 showing the details used in the preferred embodiment of the present invention. The details of FIG. 13 are particularly important in that the slot design disclosed allows for a lateral movement of horizontal member 2 in direction 42 by allowing bolt 24 to slip in the lateral direction along elongated slot illustrated in FIG. 13. By using such construction techniques, it would be appreciated that the horizontal member 2 will move in yet another dimension allowing its lateral movement in direction 42, it's a symmetrical rotation about each separate axis of the vertical member 6 in the rotational direction 26, and the full displacement in direction 32 and 33.

Figure 14:
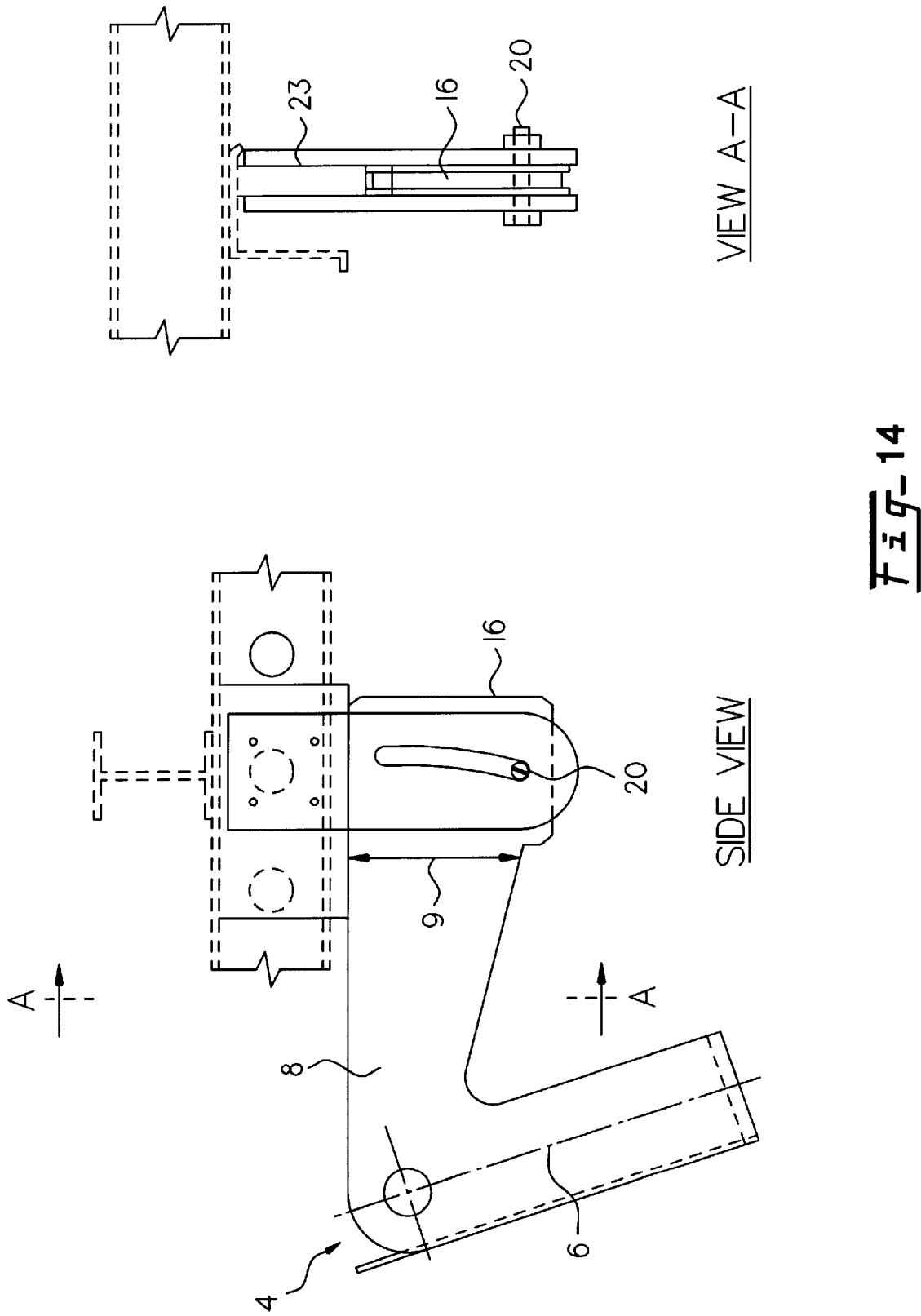
FIG. 14 is a detailed drawing of a second embodiment of the bell crank assembly showing an alternative shape of the member, along with a sectional view of the same member.
Figure 15:
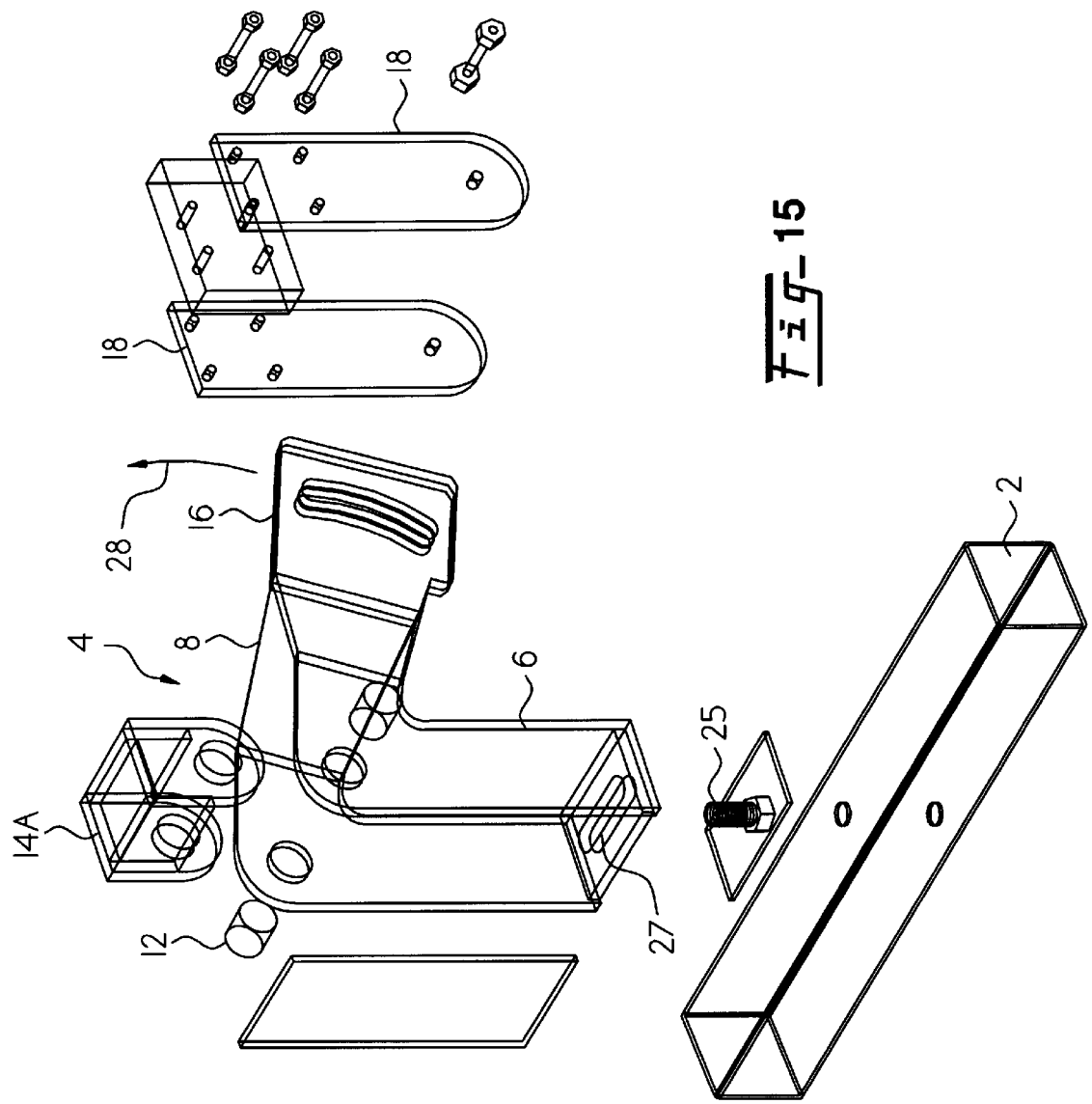
FIG. 15 is a three-dimensional exploded view of the alternative embodiment of the bell crank assembly in the associated and integral braking plate.

Turning now to FIG. 14, an alternate embodiment of the bell crank member 4 will be described. The present invention can function with various alternatives and modifications of the shape and size of the various members that comprise the bell crank member 4. FIG. 14 describes member 4 with an expanded horizontal bell crank member 8 which provides for a tighter integration of the horizontal bell crank member and brake plate 16. The first embodiment of the same member illustrates an I-beam like member which attaches to brake plate 16 as described in the various drawings. Turning to FIG. 15, the similarities between the alternative embodiment and the first embodiment described above become apparent. It can be appreciated more fully by considering FIG. 15 where brake plate 16 is integrated into the horizontal bell crank member 8 as shown. The operation of bell crank member 4 and the transmission of force from horizontal member 2 to brake plate 16 is virtually identical to that described and illustrated in the first embodiment.

However, it will be appreciated that the horizontal bell crank member 9 width is greater than the width of bell crank horizontal member 8 shown in the first embodiment.

Figure 16:
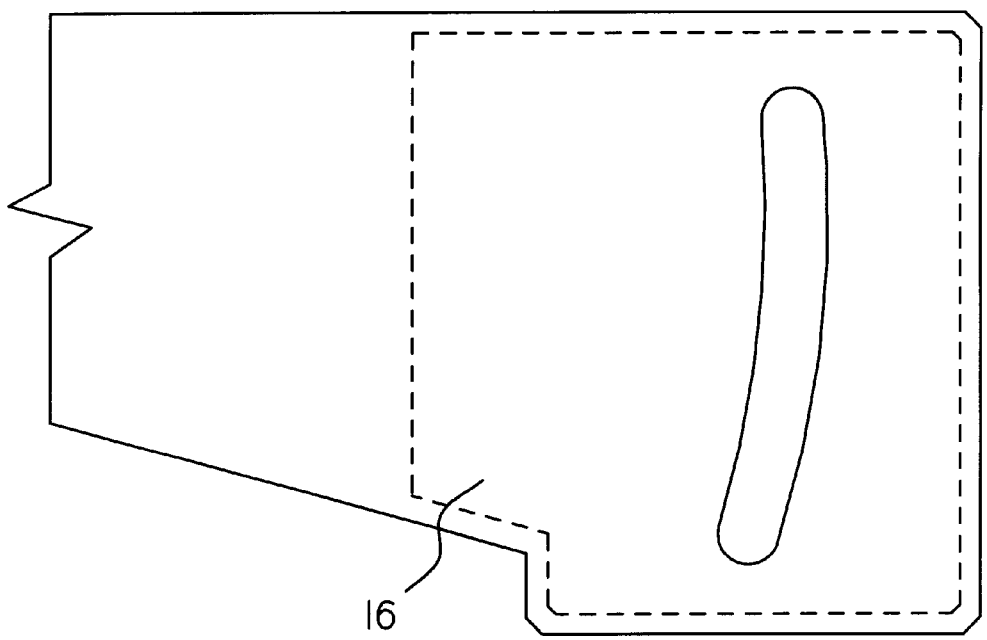
FIG. 16 is a detailed diagram of the alternative embodiment of the wedged brake plate.
Figure 17:
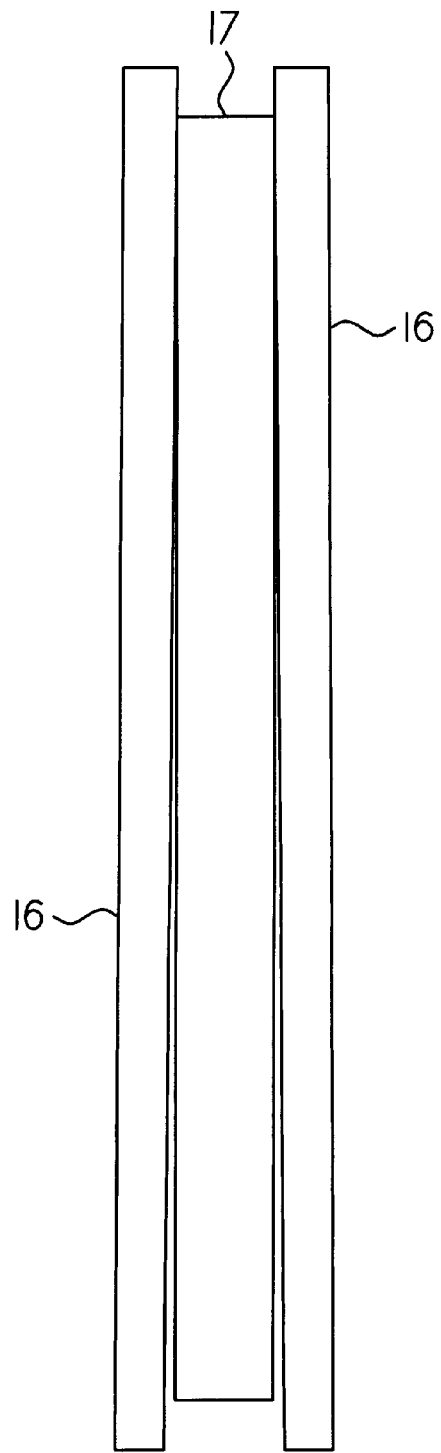
FIG. 17 is an end view of the alternative embodiment of the wedged brake plate illustrating a typical construction.

Turning now to FIG. 16, the alternative embodiment brake plate 16 is described in greater detail. The major advantage found in the alternative embodiment is the fact that brake plate 16 is a wedge design, whereby the bottom of the brake plate is 1/8" thicker than the top of the plate with an even inclaying from top to bottom. This alternative design can be further appreciated by considering the end view shown in FIG. 17. Those skilled in the art can appreciate that placing a properly-shaped spacer 17 between the brake plate 17 in the fabrication of the bell crank will allow for this wedge design. The advantage of the wedge design is that it allows for greater braking effectiveness in the absorption of the horizontal force being transmitted to the brake plate by the displacement of impact guard horizontal member 2, as described above in the specification. In the fashion so described in the alternative embodiment, forcing brake plate 16 in the direction 28 during the braking activity will cause the wedge-shaped brake plate to be forced in brake plate housing 18, forcing the housing in an outward direction because of the pressure placed by the wedge being urged vertically within the brake plate housing 18.

Turning to FIG. 18, a detailed view of the slotted fitting used in the alternative embodiment to provide for movement of the horizontal member 2 in lateral movement direction 42 is shown. FIG. 15 illustrates horizontal member jam nut fastener 24 in the alternative embodiment. It will be appreciated that the horizontal member 2 in FIG. 15 is connected to vertical bell crank member 6 using nut 24 and bolt 25 which is free to move laterally upon the application of horizontal force components because of the design of slot 27 which allows lateral freedom of movement for horizontal member 2 in relation to fastening jam nut 24.

FIG. 19 provides both a side and front view of the bell crank hanger bracket 14A used in the alternative embodiment of the present invention described above. The thicknesses and dimensions shown for the actual fabrication has been found to provide good protection from deformation of the bracket in a crash scenario.

FIG. 20 is both a top view and a side view of the horizontal member 2 used in the alternative embodiment where the horizontal member used as a bumper is fabricated rather than using folded or formed bumpers as described in FIG. 7.

The first embodiment, and the alternative embodiment described above function well to address the problem of designing an underride vehicle crash guard protection system which both absorbs energy and is not permanently damaged by the impact of an underriding vehicle in most situations. The above described invention allows for a controlled absorption of energy during a vehicle strike without deformation of the components being used in the invention. In the event of an usually high impact event which presents more energy than a particular embodiment of the invention is designed to absorb, certain of the components of the invention will begin plastic deformation, further allowing for absorption of the energy being conveyed by a vehicle strike on the guard bumper. Both vertical bell crank member 6 and horizontal bell crank member 8 will begin to deform when brake plate 16 in either embodiment strikes stop block 23 when the brake plate reaches the end of its vertical travel. Such a deformation is a further method of absorbing energy over a controlled period of time.

In such an event, it has been found that the present invention provides a quick and inexpensive replacement for the damaged parts because of the assemblies and construction used. It will be appreciated that the replacement of certain component parts as detailed in this disclosure would be a simple matter of bolting and unbolting new components to replace a damaged braking system should the need arise. This contrasts heavily with any prior art or simpler bumper systems which use fixed, unmovable underride bumpers or other systems which may absorb energy but are, by design, destroyed in the process.

Thus it is apparent that it has been provided, in accordance with the invention, a means and method for a trailer underride crash guard which fully satisfies the objectives, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims.

What is claimed is:

1. An crash bumper comprising:
   a.) a first horizontal member;
   b.) a vertical member attached to said first horizontal member in a substantially vertical direction to support said first horizontal member;
   c.) a knee joint apparatus for supporting said vertical member to a frame;
   d.) a second horizontal member operatively connected between said knee joint and a brake plate such that rotation of the knee joint from movement of the first horizontal member transfers the movement to said brake plate through said knee joint;
   e.) and a brake plate housing affixed to said brake plate in a fashion to provide resistance to movement of said brake plate.

2. An underride protection bumper comprising:
   a) A bumper extending horizontally across and below the vehicle body;
   b) at least one vertically extending bumper support, said at least one vertically extending bumper support being disposed to support the said bumper and provide for attachment of said bumper to a horizontal member, a first end of said at least one vertically extending bumper support is attached to said safety bumper, said at least one vertically extending bumper support maintaining the bumper above a road surface at a height sufficient to intercept or contact any automobile or vehicle traveling into and under said vehicle body;
   c) a second horizontal member with a first end rotatably attached to said at least one vertically extending bumper support to rotate about the same axis as the corresponding second end of the at least one vertically extending bumper support;
   d) wherein said horizontal member is attached to a brake plate attached to the said frame;
   e) wherein said brake plate is operatively connected to a brake plate housing, said brake plate housing being permanently affixed to the vehicle frame;
   f) wherein said brake plate is operatively connected to said brake plate housing with a fastening means that provides for the compression of said brake plate housing on said brake plate.

* * * * *